United States Patent [19]
Lee

[11] Patent Number: 5,657,804
[45] Date of Patent: Aug. 19, 1997

[54] MORTISE MAKING DEVICE OF A MACHINING TOOL

[76] Inventor: Chi P. Lee, No. 6, Alley 12, Lane 33, Cherngong Road, Taiping Shiang, Taichung County, Taiwan

[21] Appl. No.: 595,711

[22] Filed: Feb. 2, 1996

[51] Int. Cl.⁶ .................. B27M 1/00; B27C 5/00
[52] U.S. Cl. ............. 144/136.95; 144/83; 144/154.5
[58] Field of Search .................. 144/76, 136.95, 144/154.5, 82, 83; 409/182

[56] References Cited

U.S. PATENT DOCUMENTS

| | | | |
|---|---|---|---|
| 3,537,492 | 11/1970 | Ritt | 144/136.95 |
| 4,478,264 | 10/1984 | Miller et al. | 144/83 |
| 4,858,662 | 8/1989 | Bosten et al. | 144/136.95 |
| 4,942,912 | 7/1990 | Gakhar et al. | 144/136.95 |
| 5,160,114 | 11/1992 | Livingston | 144/136.95 |

*Primary Examiner*—W. Donald Bray
*Attorney, Agent, or Firm*—Pro-Techtor International

[57] ABSTRACT

A mortise making device of machining tool comprises a transmission member, a fixation member and a base member. The transmission member has a connection disk which is engaged securely with a rotating shaft of a machining tool and with an action disk mounted along with a cutter on an action shaft. The action shaft is provided an action shaft. The action shaft is provided with an expandable member having two guide rods. The fixation member comprises a connection piece and a sustaining plate. The base member has a vertical face and a horizontal face. The vertical face is fastened with the guide rods of the expandable member of the transmission member and is provided with a strip hole through which the cutter is advanced and withdrawn.

2 Claims, 8 Drawing Sheets

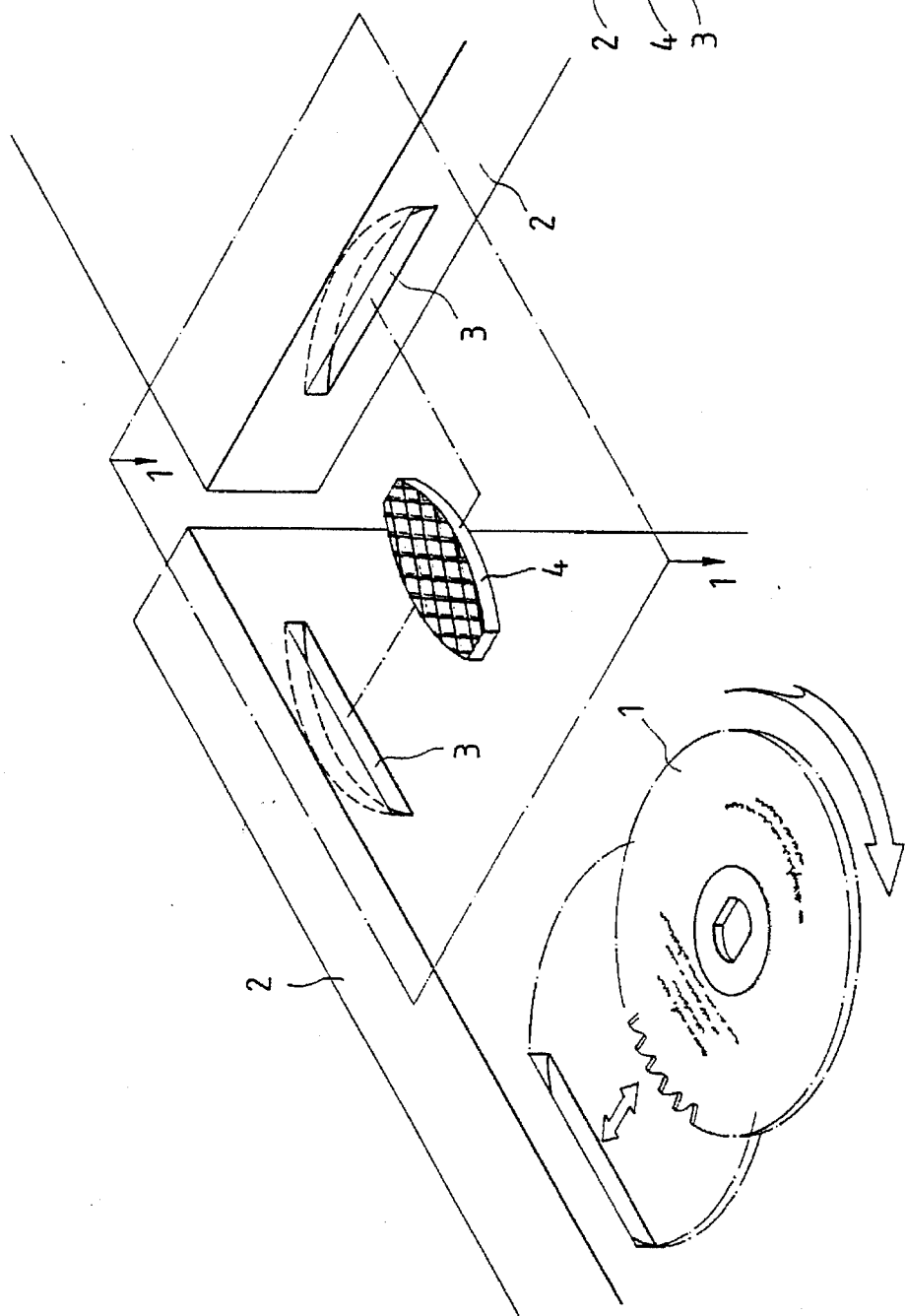
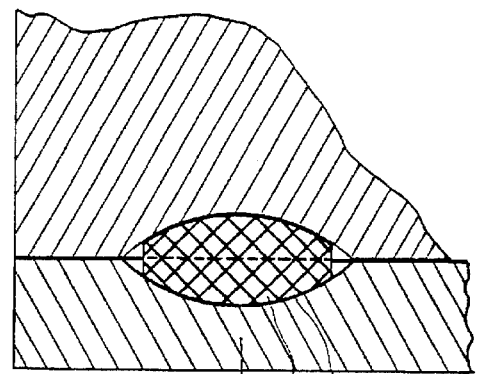
PRIOR ART
FIG. 1A
PRIOR ART
FIG. 1

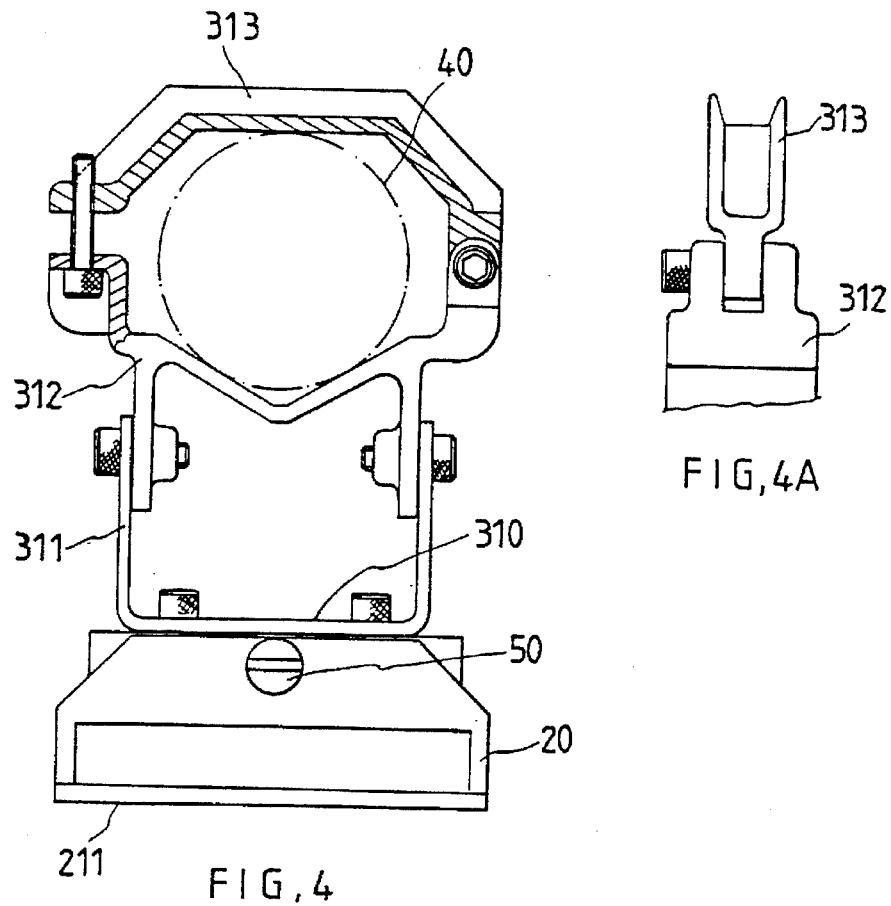
FIG. 4
FIG. 4A
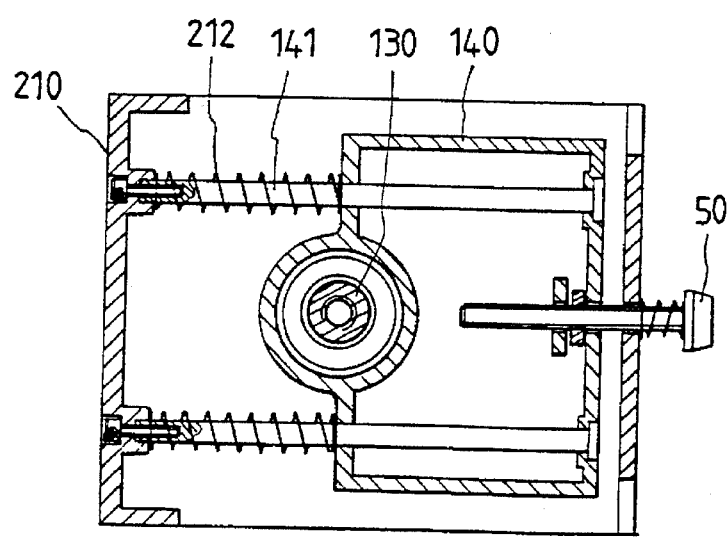
FIG. 5

5,657,804

MORTISE MAKING DEVICE OF A MACHINING TOOL

FIELD OF THE INVENTION

The present invention relates generally to a machining tool, and more particularly to a mortise making device of the machining tool.

BACKGROUND OF THE INVENTION

As illustrated in FIG. 1, the conventional way of making a mortise is to use a machining tool provided with a cutter 1 by means of which a mortise 3 is made in a piece of wood 2. The mortise 3 is shaped and dimensioned to receive a tenon 4. The conventional mortise making device is made as an integral part of the structure of a machining tool and is therefore not detachable. As a result, the machining tool can not be used for other finishing works.

SUMMARY OF THE INVENTION

The primary objective of the present invention is to provide an improved mortise making device, which comprises a transmission member, a base member and a fixing member. The transmission member comprises a connection disk which is engaged securely with a rotating shaft of the machining tool and with a driving disk mounted on a shaft. The shaft is provided with aa expandable member and an arresting block. The expandable member is provided with two guide rods which are fastened with the base member. The cutting tool is mounted securely on the shaft. The base member is provided in the vertical surface thereof with a slot through which the cutting tool can be advanced or withdrawn.

The features and functions of the present invention will be more readily understood upon a thoughtful deliberation of the following detailed description of the present invention in conjunction with the accompanying drawings.

BRIEF DESCRIPTION OF THE DRAWINGS

FIG. 1 shows a schematic view of making a mortise in a piece of wood in accordance with the prior art.

FIG. 1A is a cross sectional view following assembly of the area designated 1—1 in FIG. 1.

FIG. 4 shows a schematic plan view of the fixation member of the present invention.

FIG. 4A is a side view of the bridging plate.

FIG. 5 shows a sectional view of a portion taken along the line B—B as shown in FIG. 3.

DETAIL DESCRIPTION OF TEE INVENTION

Figure 2:
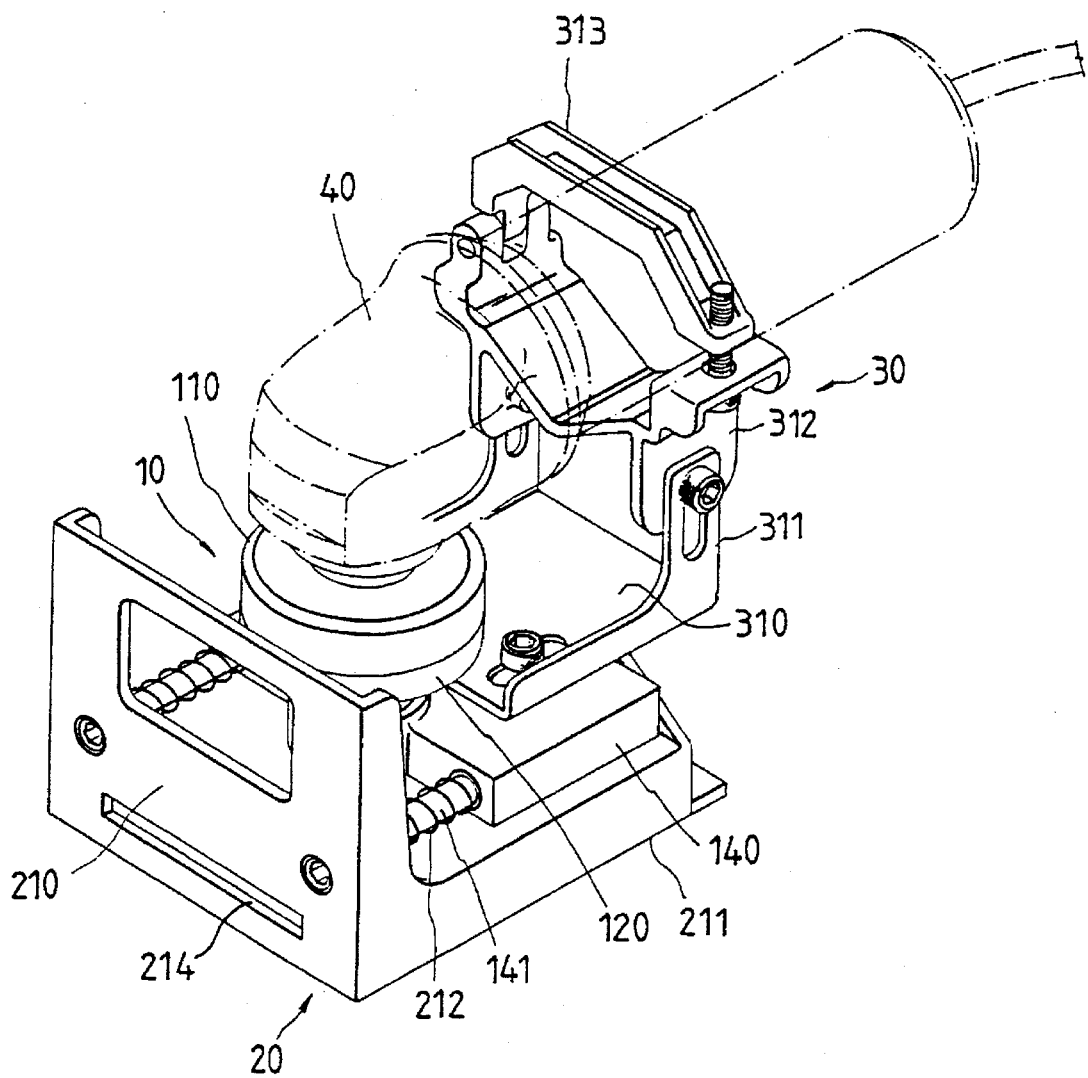
FIG. 2 shows a perspective view of the present invention.
Figure 3:
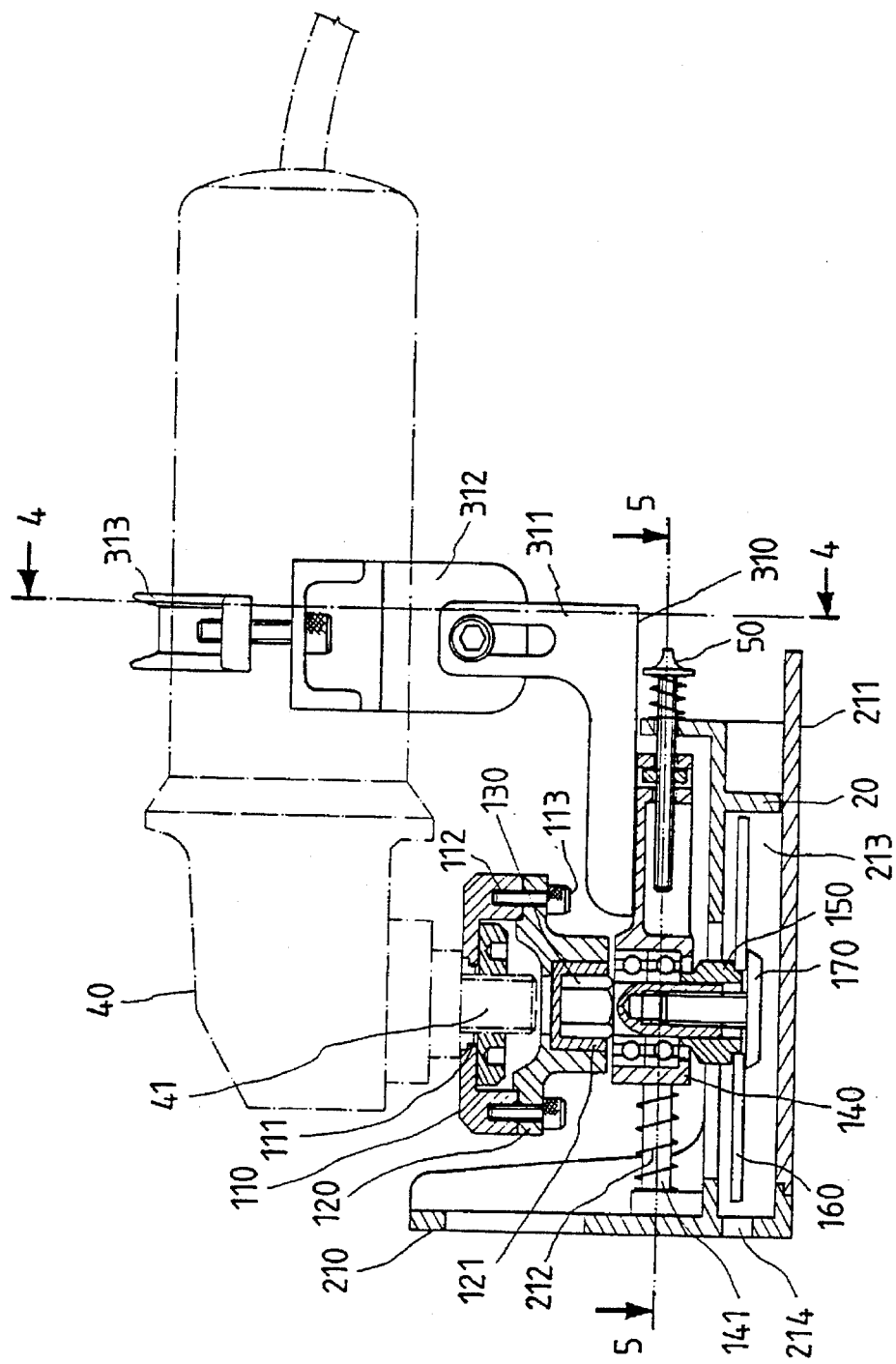
FIG. 3 shows a sectional view of the present invention.

As shows in FIGS. 2–4, a mortise making device embodied in the present invention in composed of a transmission member 10, a base member 20, and a fixing member 30. The transmission member 10 comprises a connection disk 110 provided at the center thereof with a connection hole 111 and a plurality of bolt holes 112 engageable with bolts 113 for fastening a driving disk 120 which is provided at the center thereof with a cap 121. The shaft 130 is provided with an expandable member 140 engageable with the fixing member 30. The expandable member 140 is provided with two guide rods 141 which are fastened with the base member 20. Mounted on the action shaft 130 are an arresting block 150 and a cutter 160 which is fastened securely by a fastening bolt 170.

Figure 7:
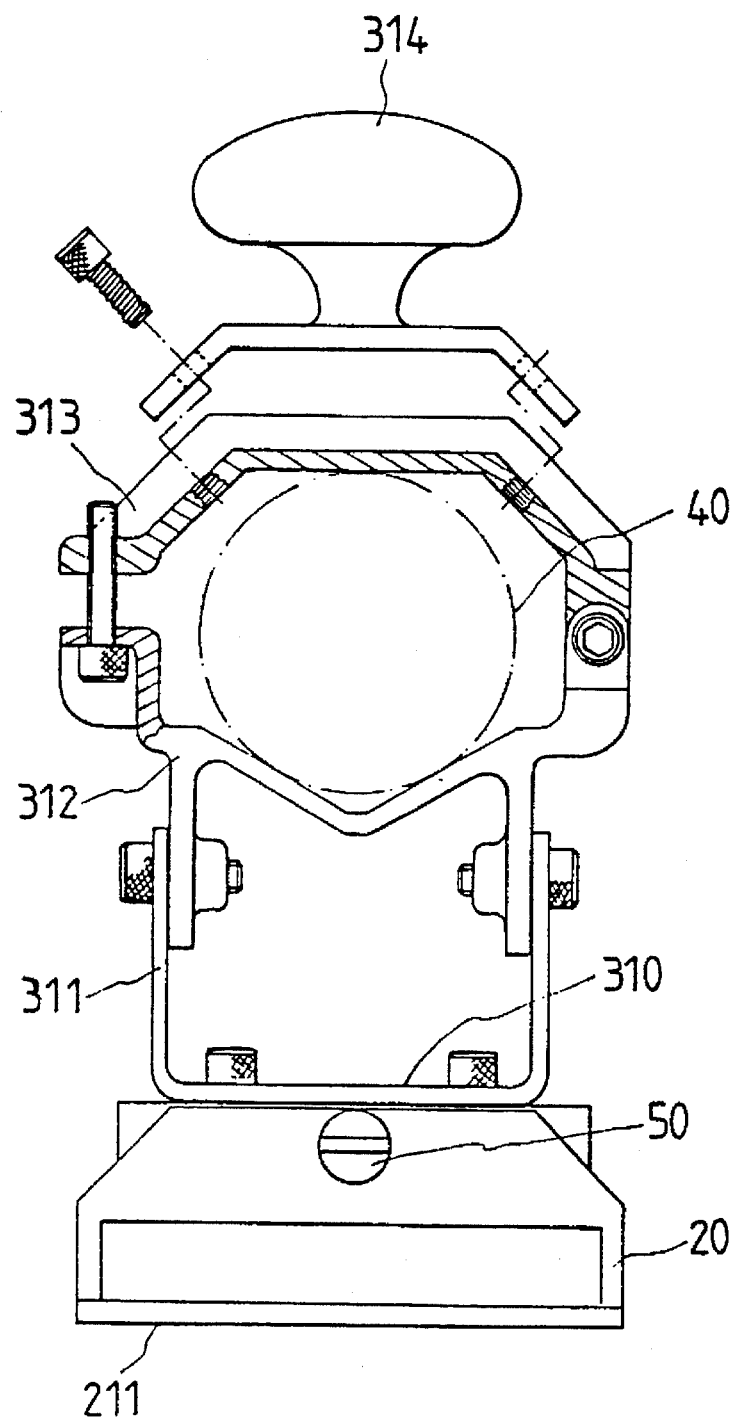
FIG. 7 shows another schematic plan view of the present invention at work.

The fixation member 30 comprises a connection piece 310, which is fastened with the expandable member 140. The fixation member 30 further comprises a projecting piece 311, which is fastened with a lower securing member 312 which is in turn fastened pivotally with a upper securing member 313 having a handle 314, as shown in FIG. 7. As the fixing member 30 is fastened with the expandable member 140, the transmission member 10 is fixed on the machining tool 40.

The base member 20 is of an L-shaped construction and is composed of a vertical face 210 and a horizontal face 211. The vertical face 210 is intended to fasten with the guide rods 141 which are fitted respectively into a spring 212. The horizontal face 211 is provided therein with an open space 213 for placing the cutter 160. The vertical face 210 is provided with a slot 214 which is horizontally oriented and is corresponding in location to the cutter 160. In other words, the cutter 160 can be advanced or withdrawn via the strip hole 214. Located opposite the vertical face 210 is an adjustment bolt 50 for adjusting the cutting depth of the cutter 160.

Figure 6:
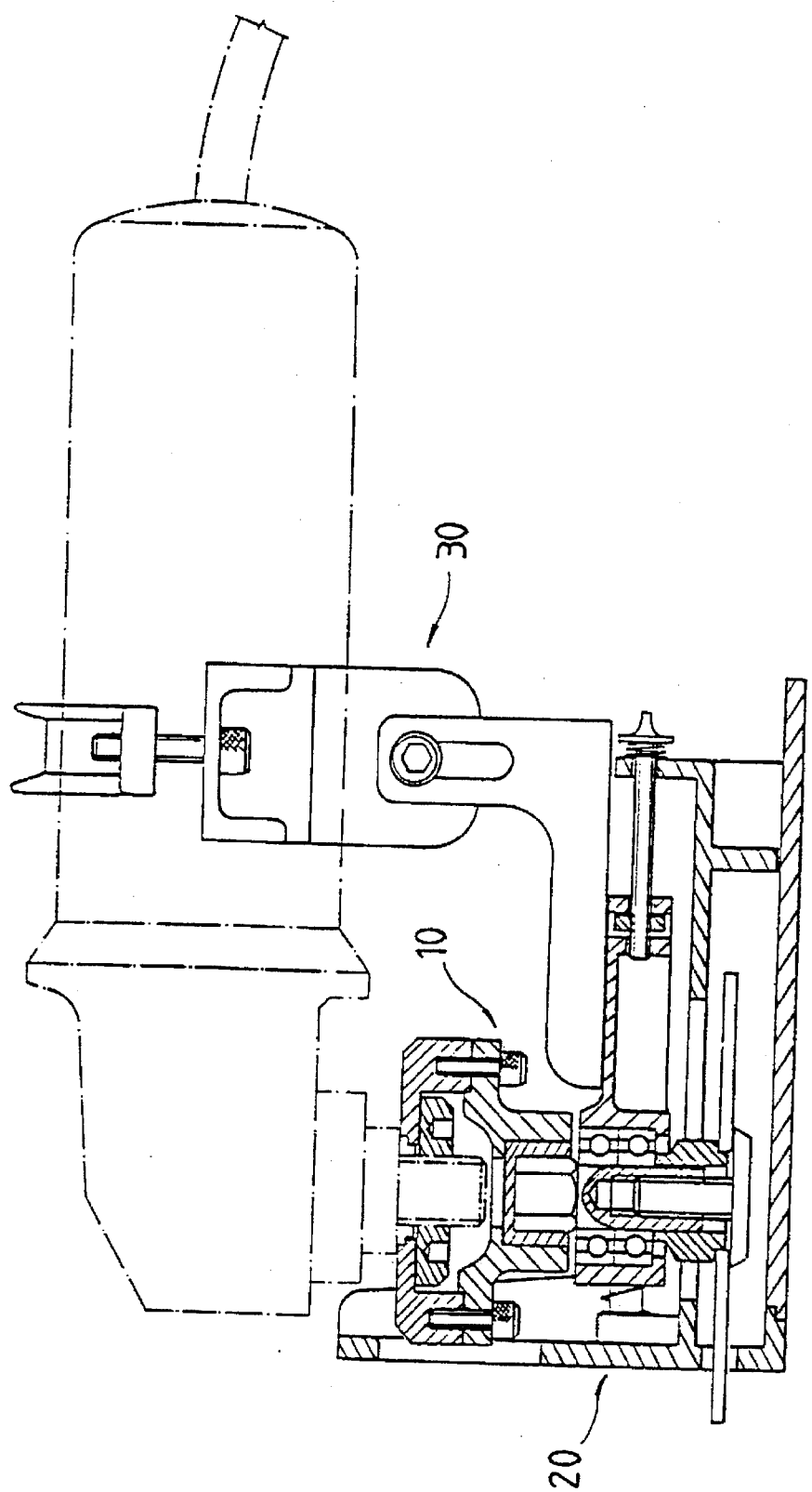
FIG. 6 shows a schematic plan view of the present invention at work.

As illustrated in FIGS. 5 and 6, when the machining tool 40 is started, the connection disk 110 of the transmission member 10 is actuated, thereby resulting in the rotation of the shaft 130 via the driving disk 120. The cutter 160 is then driven by the shaft 130 to move. In the meantime, the expandable member 140 is caused to slide forward along the guide rods 141 so as to cause the cutter 160 to advance through the slot 214 to bring about the machining operation. The advancing depth of the cutter 160 can be adjusted by the adjustment bolt 50. As the machining is completed, the cutter 160 is withdrawn by the reaction forces of the springs 212, which cause the expandable member 140 and the machining tool 40 to move backwards. The mortise making device of the present invention described above is compatible with the machining tools which are made by various manufacturers and are different in specifications, thanks to the connection disk 110 of the transmission member 10.

Figure 8:
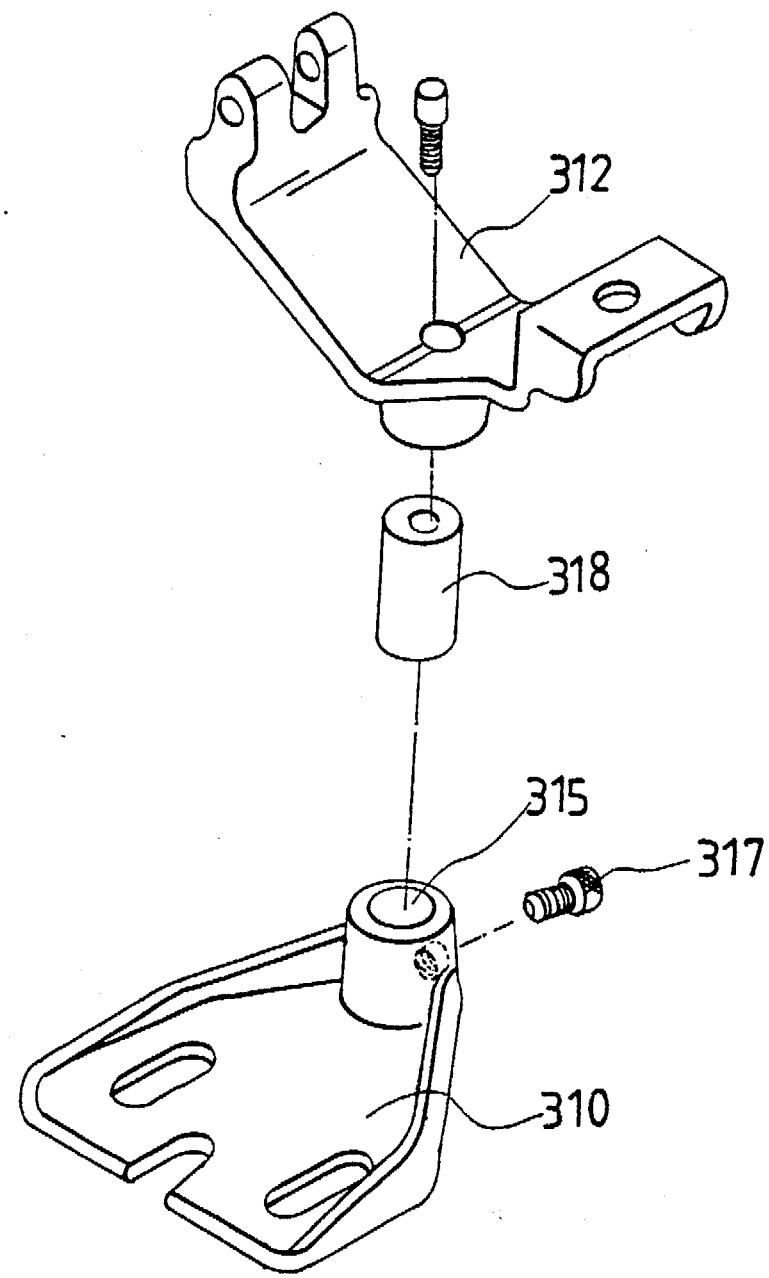
FIG. 8 shows a perspective view of a second preferred embodiment of the present invention.
Figure 9:
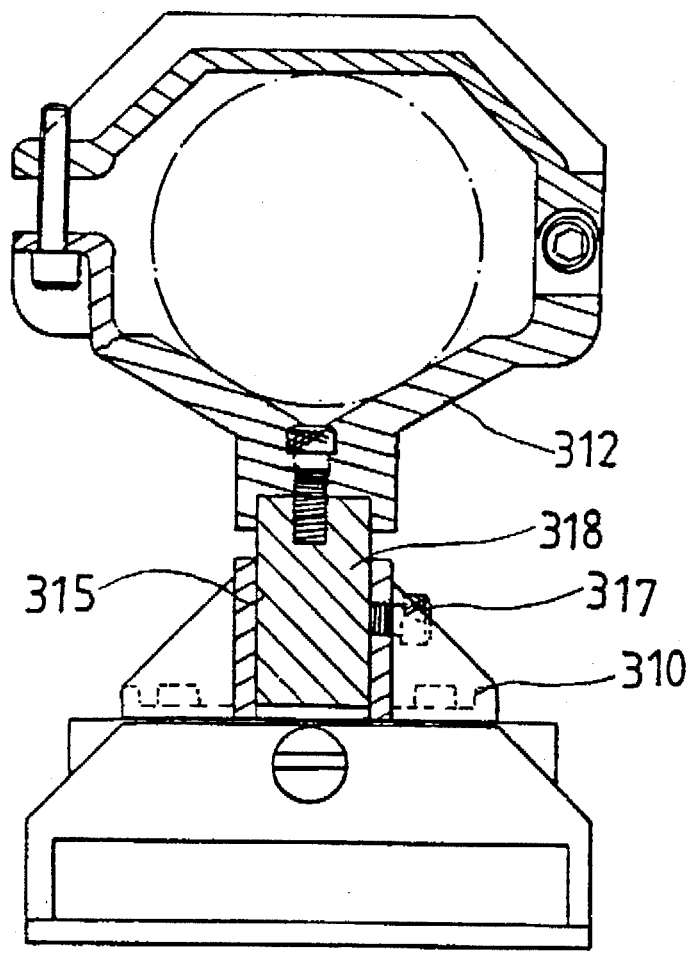
FIG. 9 shows a schematic view of the second preferred embodiment of the present invention.

As shown in FIG. 8, another preferred embodiment of the present invention comprises the connection piece 310 which is provided with a fastening hole 315 having radially a bolt hole 316 engageable with a bolt 317. Fastened with the sustaining plate 312 is a cylindrical rod 318 which is received in the fastening hole 315. When the sustaining plate 312 and the connection piece 310 remain appropriately apart, the bolt 317 is fastened to urge the cylindrical rod 318, thereby allowing the distance between the connection piece 310 and the machining tools of various heights to be adjusted, as shown in FIG. 9.

The embodiments of the present invention described above are to be regarded in all respects as being merely illustrated and not restrictive. Accordingly, the present invention may be embodied in other specific forms without deviating from the spirit thereof. The present invention is therefore to be limited only by the scopes of the following appended claims.

What is claimed is:

1. A mortise making device for a machining tool comprising:

a transmission member comprising a connection disk engageable with a rotating shaft of said machining tool, a driving disk mounted on a shaft such that said driving disk is engaged with said connection disk, said shaft is provided with an expandable member, an arresting block, and a cutter, said expandable member has two guide rods;

a fixing member comprising a connection piece, a lower securing member, and an upper securing member, said connection piece is fastened to said expandable member and to said lower securing member, said lower securing member is connected to said upper securing member, said upper securing member includes a handle; and a base member comprising a vertical face and a horizontal face, said vertical face is fastened to said guide rods of said expandable member of said transmission member, said vertical face is provided with a horizontal slot that corresponds in location to said cutter.

2. The mortise making device as claimed in claim 1 wherein:

said connection piece of said fixing member is connected to said lower securing member of said fixing member via a connecting means, said connecting means includes an adjustment means to vary a distance between said connection piece and said machining tool.

* * * * *